United States Patent
Dearth et al.

(10) Patent No.: US 8,260,992 B2
(45) Date of Patent: Sep. 4, 2012

(54) REDUCING SIMULTANEOUS SWITCHING OUTPUTS USING DATA BUS INVERSION SIGNALING

(75) Inventors: Glenn A. Dearth, Groton, MA (US); Shwetal A. Patel, San Jose, CA (US)

(73) Assignee: Advanced Micro Devices, Inc., Austin, TX (US)

( * ) Notice: Subject to any disclaimer, the term of this patent is extended or adjusted under 35 U.S.C. 154(b) by 324 days.

(21) Appl. No.: 12/758,301

(22) Filed: Apr. 12, 2010

(65) Prior Publication Data

US 2011/0252171 A1 Oct. 13, 2011

(51) Int. Cl.
- G06F 13/36 (2006.01)
- G06F 13/362 (2006.01)
- G06F 13/372 (2006.01)
- G06F 1/26 (2006.01)
- G06F 1/32 (2006.01)
- H03M 5/00 (2006.01)

(52) U.S. Cl. ........... 710/117; 710/124; 341/58; 713/320
(58) Field of Classification Search .................. 710/117, 710/124; 341/58; 713/320
See application file for complete search history.

(56) References Cited

U.S. PATENT DOCUMENTS

| | | | | |
|---|---|---|---|---|
| 6,584,526 | B1 * | 6/2003 | Bogin et al. | 710/124 |
| 7,082,489 | B2 * | 7/2006 | Yeh et al. | 710/305 |
| 7,113,550 | B2 * | 9/2006 | Stonecypher et al. | 375/288 |
| 7,221,292 | B2 * | 5/2007 | Hein | 341/55 |
| 7,228,370 | B2 * | 6/2007 | Kwack et al. | 710/52 |
| 7,280,412 | B2 * | 10/2007 | Jang et al. | 365/189.07 |
| 7,292,161 | B2 * | 11/2007 | Widmer | 341/59 |
| 2002/0156953 | A1 * | 10/2002 | Beiley et al. | 710/105 |
| 2003/0210162 | A1 * | 11/2003 | Shin et al. | 341/58 |
| 2004/0068594 | A1 * | 4/2004 | Asaro et al. | 710/104 |
| 2005/0132112 | A1 | 6/2005 | Pawlowski | |
| 2005/0182894 | A1 * | 8/2005 | LaBerge | 711/105 |
| 2005/0216630 | A1 * | 9/2005 | Gaskins et al. | 710/100 |
| 2008/0162778 | A1 * | 7/2008 | Choi et al. | 711/100 |
| 2008/0309523 | A1 * | 12/2008 | Lee | 341/55 |

(Continued)

FOREIGN PATENT DOCUMENTS

JP 58186847 A * 10/1983

(Continued)

OTHER PUBLICATIONS

Skerlj, M.; Ienne, P.;, "Error Protected Data Bus Inversion Using Standard DRAM Components," Quality Electronic Design, 2008. ISQED 2008. 9th International Symposium on, pp. 35-42, Mar. 17-19, 2008.*

(Continued)

Primary Examiner — Faisal M Zaman
(74) Attorney, Agent, or Firm — Williams, Morgan & Amerson, P.C.

(57) ABSTRACT

An apparatus includes a plurality of data lines defining a data bus for communicating data. A controller is operable to communicate a plurality of data transfers over the data bus using a plurality of data time slots, wherein for at least a subset of the data time slots the controller is operable to communicate an associated data bus inversion indicator indicating that bits communicated during the associated data time slot are inverted, the data bus inversion indicators for the subset of the data transfers are grouped into a data bus inversion vector, and the controller is operable to communicate a global data bus inversion indicator indicating an inversion of the data bus inversion vector.

19 Claims, 5 Drawing Sheets

U.S. PATENT DOCUMENTS

| | | | |
|---|---|---|---|
| 2009/0019344 A1* | 1/2009 | Yoon et al. | 714/807 |
| 2009/0103443 A1* | 4/2009 | Ku et al. | 370/249 |
| 2009/0110109 A1* | 4/2009 | Skerlj | 375/295 |
| 2009/0141564 A1* | 6/2009 | Pax | 365/189.08 |
| 2009/0182918 A1* | 7/2009 | Hollis | 710/106 |
| 2009/0219179 A1* | 9/2009 | Bae | 341/55 |
| 2009/0228624 A1* | 9/2009 | Maldei et al. | 710/100 |
| 2010/0057971 A1* | 3/2010 | Kao | 710/305 |
| 2010/0118618 A1* | 5/2010 | Kwak | 365/189.05 |
| 2010/0122130 A1* | 5/2010 | Moon | 714/719 |
| 2011/0025533 A1* | 2/2011 | Abbasfar | 341/63 |

FOREIGN PATENT DOCUMENTS

| | | | |
|---|---|---|---|
| JP | 2000068992 A * | 3/2000 | |
| JP | 2005130238 A * | 5/2005 | |
| JP | 2007282237 A * | 10/2007 | |
| JP | 2008146625 A * | 6/2008 | |
| JP | 2010118137 A * | 5/2010 | |
| WO | 02/39290 A2 | 5/2002 | |
| WO | WO 2009154797 A2 * | 12/2009 | |

OTHER PUBLICATIONS

Hollis, T.M.;, "Data Bus Inversion in High-Speed Memory Applications," Circuits and Systems II: Express Briefs, IEEE Transactions on, vol. 56, No. 4, pp. 300-304, Apr. 2009.*

Stan, M.R.; Burleson, W.P.;, "Bus-invert coding for low-power I/O," Very Large Scale Integration (VLSI) Systems, IEEE Transactions on, vol. 3, No. 1, pp. 49-58, Mar. 1995.*

Rung-Bin Lin; Chi-Ming Tsai;, "Theoretical analysis of bus-invert coding," Very Large Scale Integration (VLSI) Systems, IEEE Transactions on, vol. 10, No. 6, pp. 929-934, Dec. 2002.*

PCT Search Report and Written Opinion from PCT/US2011/031221 dated Jul. 13, 2011.

* cited by examiner

| Write OP | Transfer Time | | | | | | | | | |
|---|---|---|---|---|---|---|---|---|---|---|
| | 0 | 1 | 2 | 3 | 4 | 5 | 6 | 7 | 8 | 9 |
| DQ0 | BYTE 0 | BYTE 1 | BYTE 2 | BYTE 3 | BYTE 4 | BYTE 5 | BYTE 6 | BYTE 7 | DBI0 | CRC |
| DQ1 | | | | | | | | | DBI1 | |
| DQ2 | | | | | | | | | DBI2 | |
| DQ3 | | | | | | | | | DBI3 | |
| DQ4 | | | | | | | | | DBI4 | |
| DQ5 | | | | | | | | | DBI5 | |
| DQ6 | | | | | | | | | DBI6 | |
| DQ7 | | | | | | | | | DBI7 | |
| DM | DM0 | DM1 | DM2 | DM3 | DM4 | DM5 | DM6 | DM7 | DBIG | 1 |

Figure 3

| Read OP | Transfer Time | | | | | | | | | |
|---|---|---|---|---|---|---|---|---|---|---|
| | 0 | 1 | 2 | 3 | 4 | 5 | 6 | 7 | 8 | 9 |
| DQ0 | BYTE 0 | BYTE 1 | BYTE 2 | BYTE 3 | BYTE 4 | BYTE 5 | BYTE 6 | BYTE 7 | DBI0 | CRC |
| DQ1 | | | | | | | | | DBI1 | |
| DQ2 | | | | | | | | | DBI2 | |
| DQ3 | | | | | | | | | DBI3 | |
| DQ4 | | | | | | | | | DBI4 | |
| DQ5 | | | | | | | | | DBI5 | |
| DQ6 | | | | | | | | | DBI6 | |
| DQ7 | | | | | | | | | DBI7 | |
| DM | 1 | 1 | 1 | 1 | 1 | 1 | 1 | 1 | DBIG | 1 |

Figure 4

| Read OP | Transfer Time | | | | | | | | |
|---|---|---|---|---|---|---|---|---|---|
| | 0 | 1 | 2 | 3 | 4 | 5 | 6 | 7 | 8 |
| DQ0 | BYTE 0 | BYTE 1 | BYTE 2 | BYTE 3 | BYTE 4 | BYTE 5 | BYTE 6 | BYTE 7 | CRC |
| DQ1 | | | | | | | | | |
| DQ2 | | | | | | | | | |
| DQ3 | | | | | | | | | |
| DQ4 | | | | | | | | | |
| DQ5 | | | | | | | | | |
| DQ6 | | | | | | | | | |
| DQ7 | | | | | | | | | |
| DM | DBI0 | DBI1 | DBI2 | DBI3 | DBI4 | DBI5 | DBI6 | DBI7 | DBIG |

| Even Mode | Transfer | | | | | | | | | |
|---|---|---|---|---|---|---|---|---|---|---|
| | 0 | 1 | 2 | 3 | 4 | 5 | 6 | 7 | 8 | 9 |
| DQ0 | N | N | N | N | N | N | N | N | DBI0 | DBI3 |
| DQ1 | I | I | I | I | I | I | I | I | DBI1 | DBI4 |
| DQ2 | B | B | B | B | B | B | B | B | DBI2 | DBI5 |
| DQ3 | 0 | 1 | 2 | 3 | 4 | 5 | 6 | 7 | DBIA | DBIB |

| Odd Mode | Transfer | | | | | | | | | |
|---|---|---|---|---|---|---|---|---|---|---|
| | 0 | 1 | 2 | 3 | 4 | 5 | 6 | 7 | 8 | 9 |
| DQ0 | N | N | N | N | N | N | N | N | DBI2 | DBI5 |
| DQ1 | I | I | I | I | I | I | I | I | DBI3 | DBI6 |
| DQ2 | B | B | B | B | B | B | B | B | DBI4 | DBI7 |
| DQ3 | 0 | 1 | 2 | 3 | 4 | 5 | 6 | 7 | DBIA | DBIB |

Figure 7

REDUCING SIMULTANEOUS SWITCHING OUTPUTS USING DATA BUS INVERSION SIGNALING

CROSS-REFERENCE TO RELATED APPLICATIONS

Not applicable.

BACKGROUND

The disclosed subject matter relates generally to computing systems and, more particularly, to a method and apparatus for reducing simultaneous switching outputs using data bus inversion signaling.

In computing systems, dynamic memory devices are used to store large amounts of data for use by a processor or other computing device during its operation. Data is transferred between the computing device and the memory device over a memory bus. In such electronic systems, it is common that different power requirements exist for driving an electrical "1" versus driving an electrical "0". For example, in some double data rate (DDR) synchronous dynamic random access memory (SDRAM), more power is consumed driving a "0" than a "1".

Data bus inversion (DBI) is an I/O signaling technique that aims to reduce DC power consumption by selectively inverting the data bus for systems where the power consumed between alternate signaled states is asymmetric. The device communicating the data (i.e., the processor for a write operation or the memory device for a read operation) counts the number of 0s driven on a bus during a bit transfer time, and if more than half the bus is electrical 0, the bus state is inverted. A DBI indicator bit is toggled to indicate that bus inversion has occurred. If the number of 0s and 1s in the bit transfer time are less than or equal to half the bus width, no inversion takes place. When the receiving device processes the data, the DBI indicator bit is used as a trigger to invert the data again to reconstitute the original data pattern. In this manner, the average number of 1s transmitted in a bit transfer time is increased, thereby reducing DC power. Bus inversion may also be used in the case of address lines. Hence, as used herein the term data bus inversion applies generically to any type of bus inversion, such as DQ buses or address buses.

DBI also has the property of reducing simultaneous switching outputs (SSO), defined as the absolute value of the number outputs that change to 1 minus the number of outputs that change to 0 in two consecutive bit time transfers. In a system where transmitting 1s is lower power than transmitting 0s, the transmitted DBI bit is defined as 1 for no inversion and 0 for inversion. If all bit transfer times require inversion (e.g., a stream of 0s, which would be inverted to 1s), and the DBI vector is transmitted after the last data transfer time, the system sees a worst case SSO transition where the last data transfer is all 1s and the DBI bit transfer is all 0s. Thus, DBI can introduce new SSO problems and reduce the overall SSO benefit.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in an apparatus including a plurality of data lines defining a data bus for communicating data. A controller is operable to communicate a plurality of data transfers over the data bus using a plurality of data time slots, wherein for at least a subset of the data time slots the controller is operable to communicate an associated data bus inversion indicator indicating that bits communicated during the associated data time slot are inverted, the data bus inversion indicators for the subset of the data transfers are grouped into a data bus inversion vector, and the controller is operable to communicate a global data bus inversion indicator indicating an inversion of the data bus inversion vector.

Another aspect of the disclosed subject matter is seen in a method including communicating a plurality of data transfers over a plurality of data lines defining a data bus using a plurality of data time slots, communicating a data bus inversion indicator for at least a subset of the data time slots indicating that bits communicated during the associated data time slot are inverted, wherein the data bus inversion indicators for the subset of the data transfers are grouped into a data bus inversion vector, and communicating a global data bus inversion indicator indicating an inversion of the data bus inversion vector.

BRIEF DESCRIPTION OF THE SEVERAL VIEWS OF THE DRAWINGS

The disclosed subject matter will hereafter be described with reference to the accompanying drawings, wherein like reference numerals denote like elements, and:

FIG. 7 is a diagram illustrating data transfers using a global DBI signaling technique While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
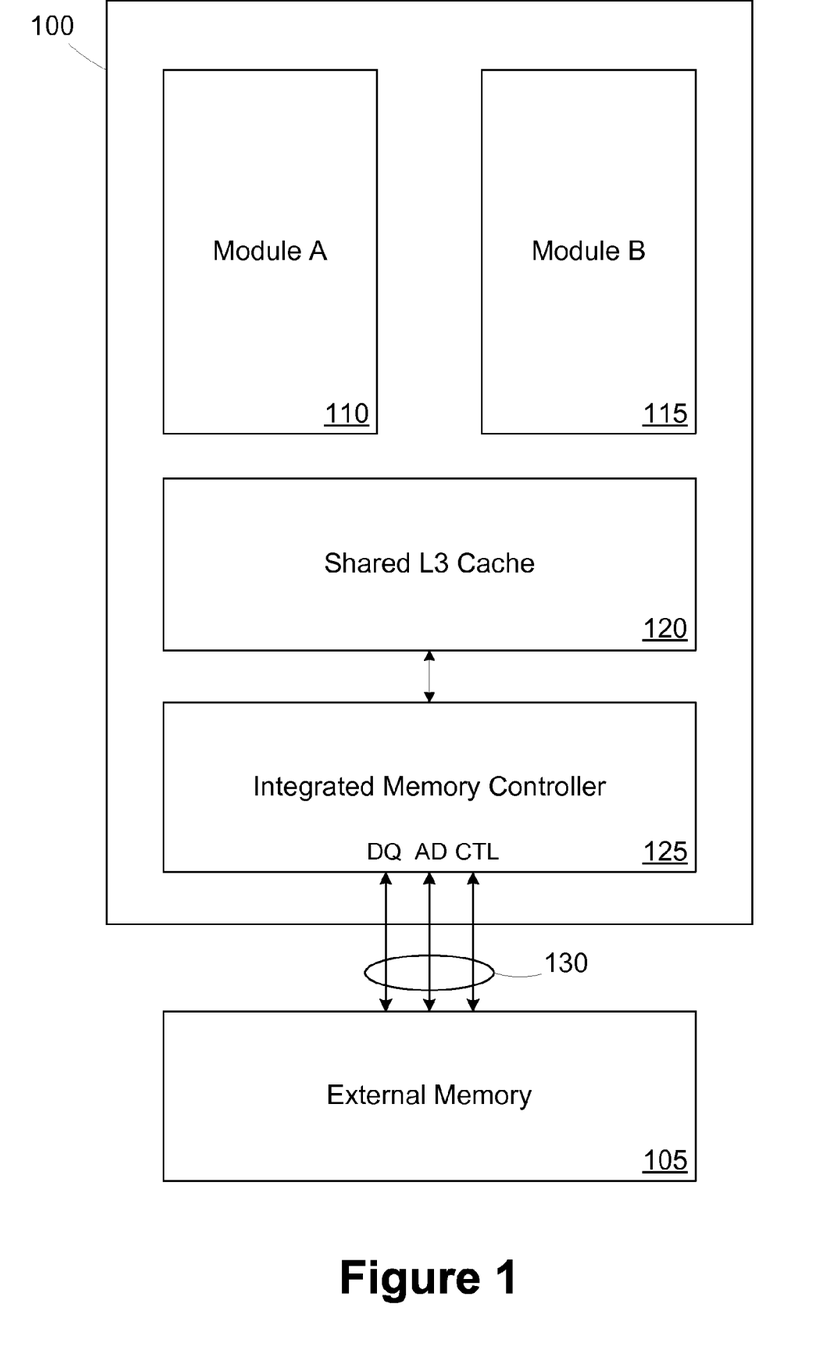
FIG. 1 is a simplified block level diagram of a microprocessor interfaced with external memory.

Referring now to the drawings wherein like reference numbers correspond to similar components throughout the several views and, specifically, referring to FIG. 1, the disclosed subject matter shall be described in the context of a microprocessor 100 coupled with an external memory 105. Those skilled in the art will recognize that a computer system may be constructed from these and other components. However, to avoid obfuscating the instant invention only those components useful to an understanding of the present invention are included.

In one embodiment, the microprocessor 100 employs a pair of substantially similar modules, module A 110 and module B 115. The modules 110, 115 include similar processing capabilities. The modules 110, 115 engage in processing under the control of software, and thus access memory, such as external memory 105 and/or caches, such as a shared L3 cache 120 and/or internal caches (not shown). An integrated memory controller 125 is provided to interface the modules 110, 115 with the external memory 105 over a memory bus 130. Those skilled in the art will appreciate that each of the modules 110, 115 may include additional circuitry for performing other useful tasks.

In general, the memory bus 130 includes data lines (DQ), address lines (AD), and control lines (CTL), such as chip select (CS), write enable (WE), bank select (BS), column access strobe (CAS), row access strobe (RAS), data mask (DM), and clock (CLK). In the illustrated embodiment, the external memory 105 is a double data rate (DDR) memory, where data may be transferred on both rising and falling edges of the clock signal.

The integrated memory controller 125 and the external memory 105 communicate using a data bus inversion (DBI) scheme, where the bits driven on the DQ lines and/or address lines may be inverted to reduce the power consumption of the device or reduce noise by limiting the number of simultaneously switching outputs (SSO). For purposes of illustration, the following examples relate to the inversion of the DQ lines, however, the concepts may be applied to any bus, such as an address bus. In general, data transfers occupy n time slots, and the data bus inversion is controlled by an n-bit DBI vector, where each bit in the vector indicates whether the associated bits in the time slot have been inverted. In addition to the conventional DBI vector, a global DBI (DBIG) bit is utilized to indicate whether the DBI vector itself has been inverted. Providing the global DBI control increases the degree of control so that power savings and/or noise performance are not compromised by the DBI vector.

In some embodiments, the global DBI bit may be communicated within the data time slots, while in other embodiments, the global DBI bit may be communicated using a sideband signal (i.e., outside the bits of the data transfer).

Figure 2:
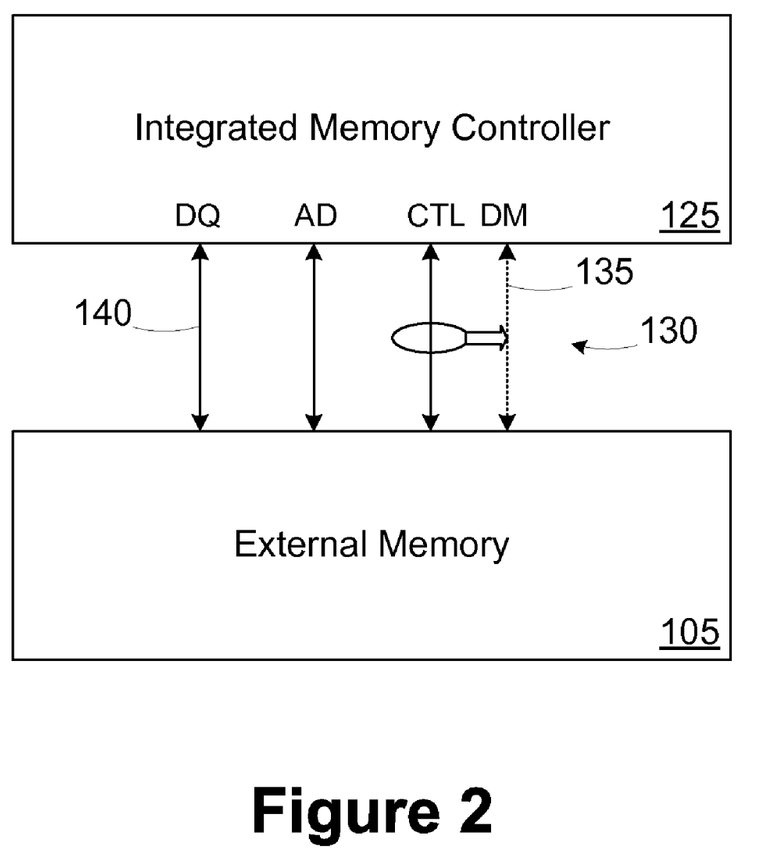
FIG. 2 is simplified block diagram illustrating the interface between a memory controller and a memory in the system of FIG. 1.
Figure 3:
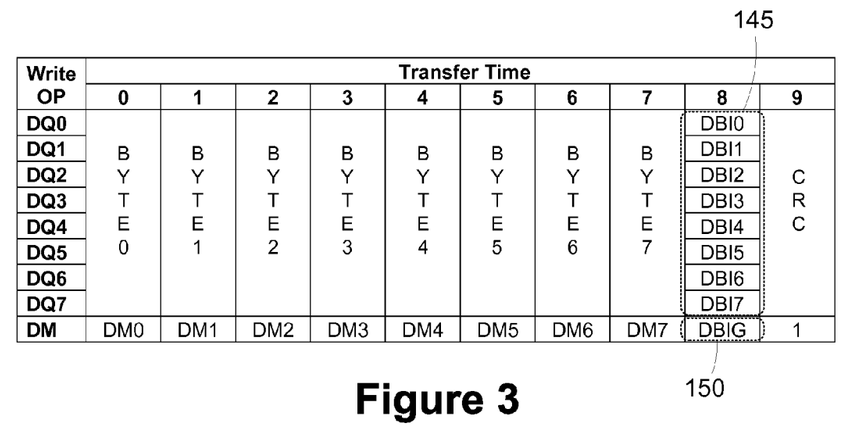
FIGS. 3-5 are diagrams illustrating data transfers using a sideband DBI signaling technique.
Figure 4:
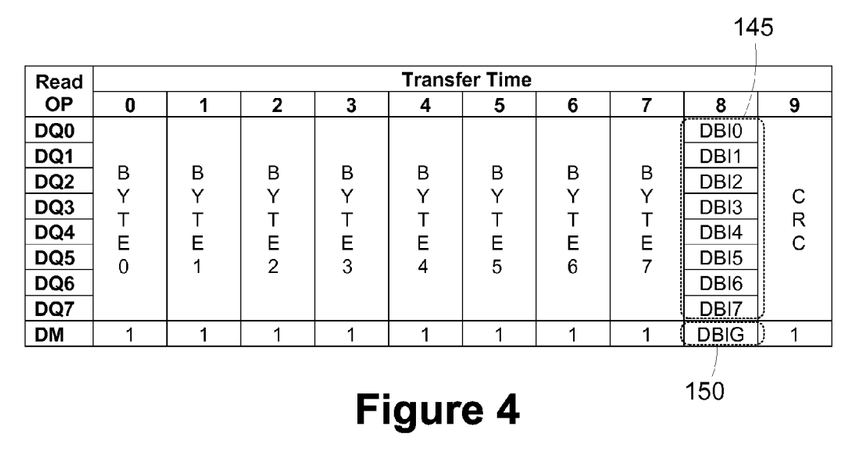
Figure 5:
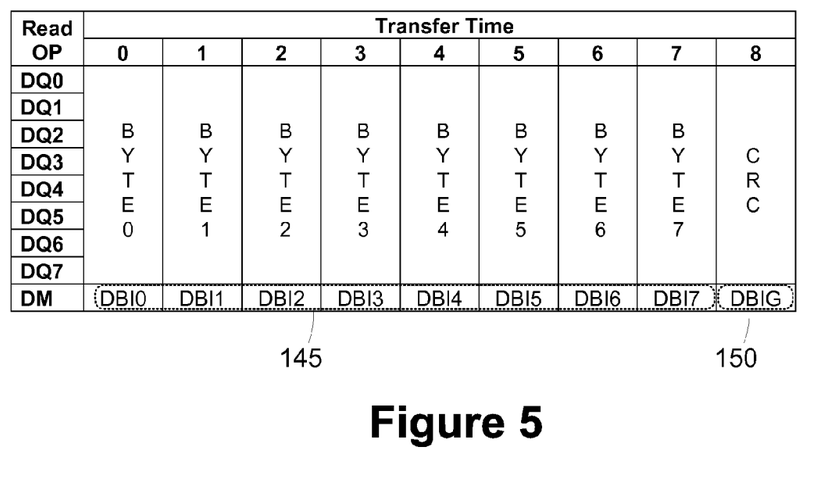

As illustrated in FIGS. 2-5, a first topology for communicating a global DBI control bit using a side band signal is illustrated. In the embodiment of FIG. 2, it is assumed that the external memory 105 has an 8-bit data bus and that a data transfer is implemented using 8 data time slots, 1 DBI control time slot, and 1 cyclic redundancy check (CRC) time slot. It is also assumed that a bit value of "1" is the low power state for the external memory 105. Conventionally, a data mask (DM) line 135 is used during write operations to indicate when data on the DQ lines 140 is valid. If the DM bit is asserted for a data slot, the data is ignored. The DM line 135 is typically unused during a read operation. In accordance with the present embodiment, the DM line 135 is used in a bidirectional manner to communicate DBI signaling information, as illustrated in FIG. 3 for a write operation and as illustrated in FIG. 4 or 5 for a read operation.

As shown in the write operation of FIG. 3, data time slots 0-7 are implemented conventionally, where the DM bit is used to selectively mask the bytes being written. During time slot 8, a DBI vector 145 is communicated on the DQ lines 140 indicating whether the bytes in the previous data slots had been inverted. A global DBI bit (DBIG) 150 is communicated using the DM line 135. Hence, if the DBIG bit 150 is asserted, the external memory 105 is signaled that the DBI vector 145 has itself been inverted. In response to the assertion of the DBIG bit 150, a controller in the external memory 105 inverts the DBI vector 145 and then uses the inverted values for processing the bytes in the data time slots.

As shown in the read operation of FIG. 4, data transfer slots 0-7 are implemented conventionally, and the DM bit is unused (i.e., held at the low power state of "1". During time slot 8, the DBI vector 145 is communicated on the DQ lines 140 to indicate whether the bytes in the previous data time slots have been inverted. The global DBI bit (DBIG) 150 is communicated using the DM line 135 during the DBI time slot 8. Hence, if the DBIG bit 150 is asserted, the memory controller 125 is signaled that the DBI vector 145 has itself been inverted. In response to the assertion of the DBIG bit 150, the memory controller 125 inverts the DBI vector 145 and then uses the inverted values for processing the bytes in the data time slots.

FIG. 5 illustrates an alternative embodiment of a read operation, where data time slots 0-7 are implemented conventionally, but the DM line 135 is used to communicate the DBI vector 145. In data slot 8, the CRC data is sent, and the DBIG bit 150 is communicated using the DM line 135.

Figure 6:
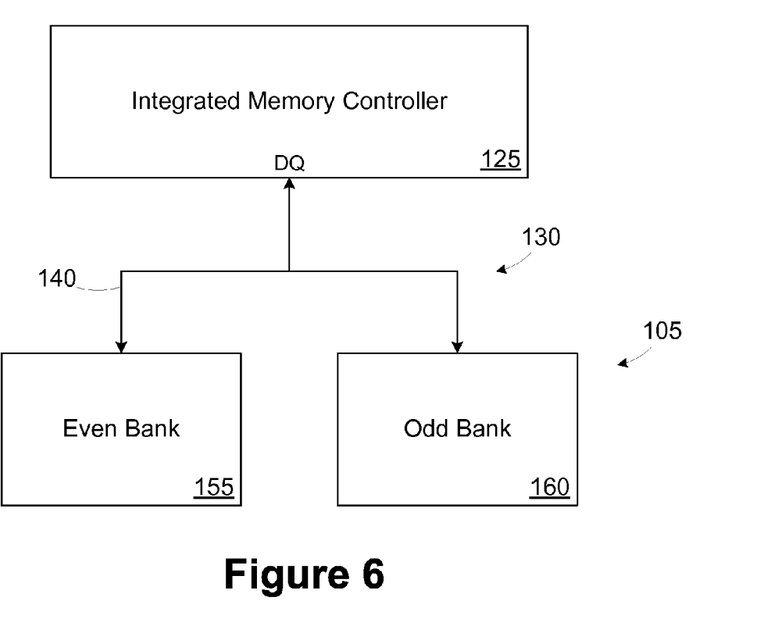
FIG. 6 is a simplified block diagram of an alternative embodiment of an interface between the memory controller and the memory in the system of FIG. 1.
Figure 7:
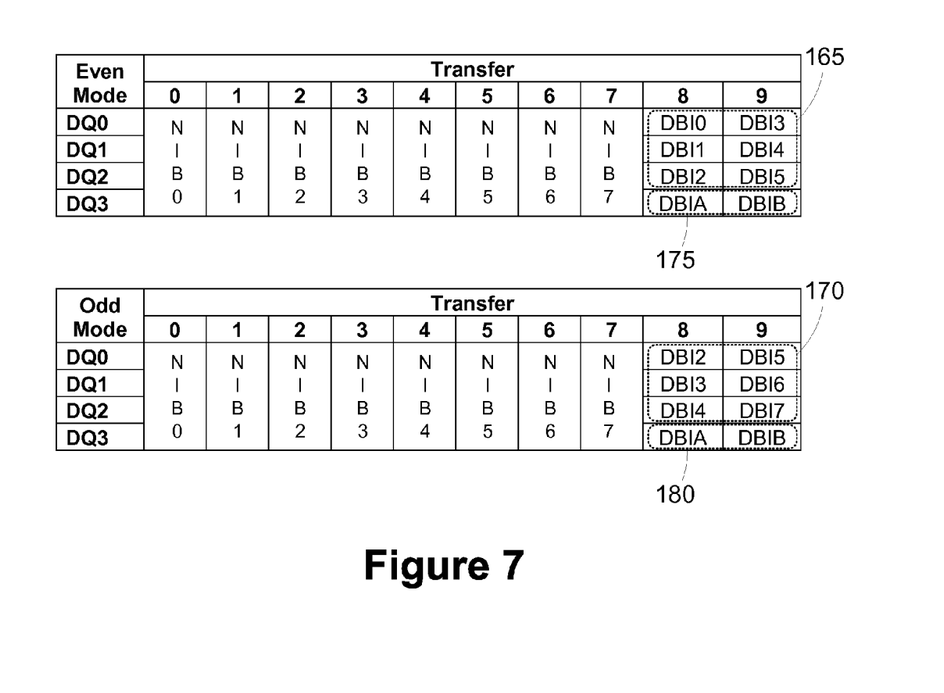

Turning now to FIGS. 6 and 7, another embodiment is described where a sideband signal is not available for communicating the global DBI information. As shown in FIG. 6 the external memory 105 may include a bank of two 4-bit DDR memories 155, 160 grouped an 8-bit arrangement. The memory 155 is designated as an even bank, and the memory 160 is designated as an odd bank through the use of mode registers. The DQ lines 140 of the even bank 155 and those of the odd bank 160 are interleaved by bank. This interleaving pattern repeats for additional banks. In 4-bit implementations, data mask lines are not typically available for the memories 155, 160, so there is no sideband pin for sending a global DBI signal. As illustrated in FIG. 7, to enable the use of global DBI, the number of data slots for which DBI is implemented is reduced, and the global DBI bit 150 is sent over the DQ lines 140 along with a reduced DBI vector 165, 170 for each memory 155, 160.

The nibbles communicated in data slots 0-7 are conventional. However, rather than providing a DBI vector having 8 bits corresponding to the 8 data time slots, each DBI vector 165, 170 only covers 6 time slots. In the illustrated embodiment, the DBI vector 165 for the even mode memory 155 implements DBI for data slots 0-5, and the odd mode memory implements DBI for data slots 2-7. The nibbles in time slots 6 and 7 for the even mode memory 155 and nibbles in time slots 0 and 1 for the odd mode memory 160 are never inverted. The DBI vectors 165, 170 are communicated over control time slots 8 and 9. A global DBI vector 175, 180 is also sent in control time slots 8 and 9, with a DBIA bit indicating if the time slot 8 portion of the DBI vector 165, 170 has been inverted, and a DBIB bit indicating if the time slot 9 portion of the DBI vector 165, 170 has been inverted.

Using this approach, the maximum 8 SSO over 8 bits between bit transfer slots 7 and 8 and between slots 8 and 9 can be avoided. Albeit, there is a slight reduction in DC power savings because there are four slots where only one nibble of the pair is covered by DBI. The SSO reduction over both banks 155, 160 in the pair is better than the SSO characteristic of each bank individually. While the SSO characteristic for a single bank would be worst case of 4, over the two adjacent banks, the SSO is limited to a maximum of 6.

The DBI signaling techniques described herein enable DBI with minimum SSO. For x8/x16 devices having a sideband signal to carry the global DBI bit 150, the SSO is less than 4. For x4 devices without a sideband signal, the SSO is a maximum of 6 over 8 bits. Reducing power consumption has the potential to reduce cooling requirements and extend battery life. Reducing SSO improves noise performance, which may have the potential to increase the maximum frequency at which the memory bus operates.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. An apparatus, comprising:
    a plurality of data lines defining a data bus for communicating data;
    a controller operable to communicate a plurality of data transfers over the data bus using a plurality of data time slots, wherein for at least a subset of the data time slots the controller is operable to communicate an associated data bus inversion indicator indicating that bits communicated during the associated data time slot are inverted, the data bus inversion indicators for the subset of the data transfers are grouped into a data bus inversion vector, and the controller is operable to communicate a global data bus inversion indicator indicating an inversion of the data bus inversion vector.

2. The apparatus of claim 1, further comprising a signal line, and wherein the controller is operable to communicate the global data bus inversion indicator over the signal line.

3. The apparatus of claim 2, wherein the signal line comprises a data mask line.

4. The apparatus of claim 3, wherein the data bus inversion vector is communicated over the data lines in a control time slot other than the plurality of data time slots, and the controller is operable to communicate data mask information over the data mask line for the data transfers during a write operation and communicate the global data bus inversion indicator over the data mask line during the control time slot.

5. The apparatus of claim 3, wherein the data bus inversion vector is communicated over the data lines in a control time slot other than the plurality of data time slots, and the controller is operable to communicate the global data bus inversion indicator over the data mask line during the control time slot.

6. The apparatus of claim 1, wherein the data bus inversion vector is communicated over the data lines in a control time slot other than the plurality of data time slots.

7. The apparatus of claim 6, wherein the global data bus inversion indicator is communicated over the data lines during the control time slot.

8. The apparatus of claim 7, wherein the data lines are grouped into a first group and a second group, the data bus inversion vector has a first portion associated with the first group and a second portion associated with the second group, the first portion covers the first subset of the data time slots, the second portion covers a second subset of the time slots, and the data time slots not included in the first subset do not overlap the data time slots not included in the second subset.

9. The apparatus of claim 8, wherein the first group is associated with a first memory and the second group is associated with a second memory.

10. The apparatus of claim 1, wherein the controller is a memory controller.

11. The apparatus of claim 1, wherein the controller is integrated into a memory device.

12. The apparatus of claim 1, further comprising:
    a processor; and
    a memory, wherein the plurality of data lines connect the processor to the memory.

13. The apparatus of claim 1, wherein the data bus comprises an address bus.

14. A method, comprising:
    communicating a plurality of data transfers over a plurality of data lines defining a data bus using a plurality of data time slots;

communicating a data bus inversion indicator for at least a subset of the data time slots indicating that bits communicated during the associated data time slot are inverted, wherein the data bus inversion indicators for the subset of the data transfers are grouped into a data bus inversion vector; and communicating a global data bus inversion indicator indicating an inversion of the data bus inversion vector.

15. The method of claim 14, wherein communicating the global data bus inversion indicator comprises communicating the global data bus inversion indicator using at least one of the data lines.

16. The method of claim 15, wherein the data bus inversion vector covers less than a total number of the data time slots, and the global data bus inversion indicator is communicated with the data bus inversion vector during at least one control time slot.

17. The method of claim 14, wherein communicating the global data bus inversion indicator comprises communicating the global data bus inversion indicator using a signal line associated with the data bus other than the data lines.

18. The method of claim 17, wherein the signal line comprises a data mask line.

19. The method of claim 14, wherein the data bus comprises an address bus.

\* \* \* \* \*